No. 853,322. PATENTED MAY 14, 1907.
E. D. ROCKWELL.
TROLLEY HARP.
APPLICATION FILED MAY 7, 1906.
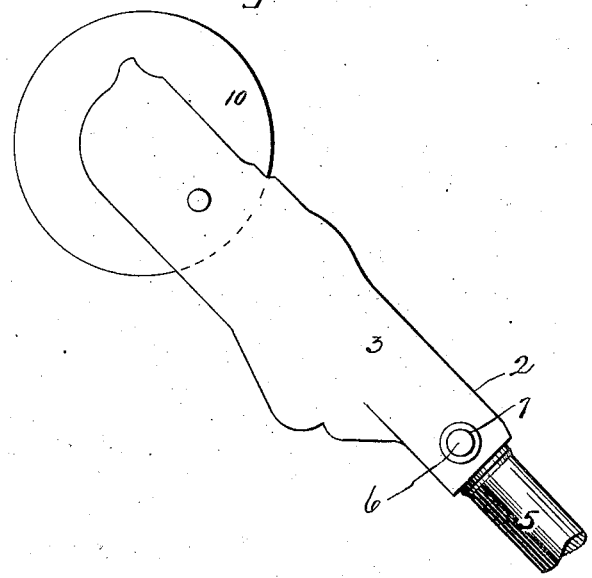
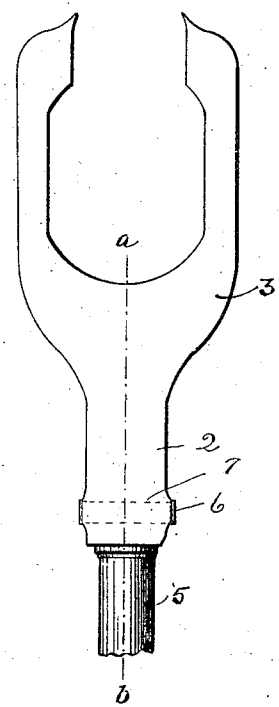
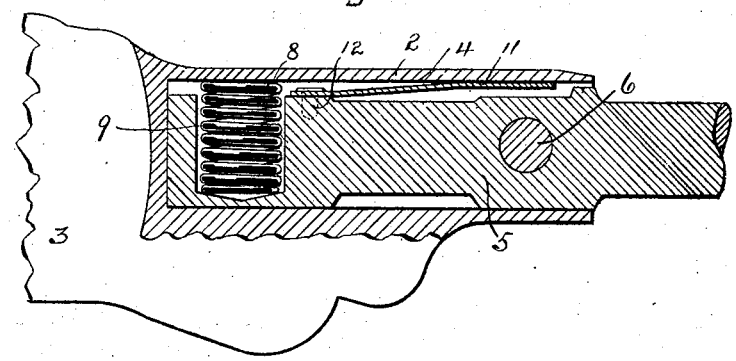

UNITED STATES PATENT OFFICE.

EDWARD D. ROCKWELL, OF BRISTOL, CONNECTICUT, ASSIGNOR, BY MESNE ASSIGNMENTS, TO THE NEW DEPARTURE MANUFACTURING COMPANY, OF BRISTOL, CONNECTICUT, A CORPORATION OF CONNECTICUT.

TROLLEY-HARP.

No. 853,322.

Specification of Letters Patent.

Patented May 14, 1907.

Application filed May 7, 1906. Serial No. 315,582.

*To all whom it may concern:*

Be it known that I, EDWARD D. ROCKWELL, a citizen of the United States, residing at Bristol, in the county of Hartford and State of Connecticut, have invented a new and useful Improvement in Trolley-Harps; and I do hereby declare the following, when taken in connection with the accompanying drawings and the letters of reference marked thereon, to be a full, clear, and exact description of the same, and which said drawings constitute part of this specification, and represent, in—

Figure 1 a view in side elevation of a trolley-wheel harp constructed in accordance with my invention. Fig. 2 a plan view thereof. Fig. 3 a view thereof on an enlarged scale, on the line $a$—$b$ of Fig. 2.

My invention relates to an improvement in trolley-harps, the object being to provide for the protection of a harp and its wheel against breakage or damage resulting from the shock sustained by the passing of the wheel over obstructions of whatever character, such as coupling-sleeves, switches, circuit-breakers, block-signals, &c., in the transmission wires as well as to protect the obstructions themselves against injury.

A further object of my invention is to insure the retention of the wheel upon the wires and to prevent "arcing."

With these ends in view, my invention consists in a trolley-harp having certain details of construction and combinations of parts as will be hereinafter described and pointed out in the claims.

In carrying out my invention as herein shown, I form the stem 2 of the harp 3 with a chamber or socket 4 for the reception of the upper end of a rod-like shank 5 pivotally secured within the said stem by a pivot or pin 6 passing through it and through bearing holes 7 formed in the sides of the stem near the lower end thereof. The upper end of the said shank is just enough smaller than the diameter of the chamber 4 to permit the harp to have a slight rocking movement upon the pin. At its extreme upper end the shank 5 is formed with a transverse recess 8 for the reception of a helical buffer spring 9 the outer end of which impinges against the wall of the chamber 4, whereby, under normal conditions, the spring 9 holds the harp 3 virtually rigid with respect to the shank 5 and to the trolley-pole (not shown) in the upper end of which the said shank is mounted. The said recess has been spoken of as a transverse recess because its axis is at a right angle to the longitudinal axis of the shank.

In order to at all times insure a path for the current from the trolley-wheel 10 through the harp 3 to the shank, I employ a contact spring 11 located within the said chamber 4 and attached by a screw 12 to the shank and having its free end engaged with the inner wall of the chamber 4.

The construction of the harp itself and the particular means adapted for mounting the wheel therein may be varied as desired, though I may say that my present invention is well adapted for use in conjunction with a harp of the construction shown and described in my prior patent No. 802,173 granted October 17th, 1905.

It will be understood from the foregoing that when the trolley-wheel 10 passes over any obstructions in the transmission wires, such as coupling-sleeves, switches, block-signals, circuit-breakers, &c., the spring 9 will yield and permit the harp 3 to turn upon the pivot pin 6 to a greater or less degree according to the stiffness of the spring and the character of the shock. In this way the shock will be broken by the yielding of the harp and absorbed, as it were, by the power of the spring. Breakage or damage of the harp and its related parts will thus be avoided as well as the breakage or damage or undue wear of the obstructions themselves. In using the word "obstructions" I intend to cover any device of whatever character placed in or associated with the transmission wires such as coupling-sleeves, switches, block-signals, circuit-breakers, &c. Furthermore, as, under my construction, the wheel will yield and the shock of striking the obstruction will be absorbed, the rebound of the wheel will be prevented and its retention upon the wire secured.

Another advantage achieved is that of preventing the "arcing" resulting from the rebound of the wheel in passing over obstructions. The spring being well housed within the shank of the harp, is protected from the weather as well as from blows. If desired, it may be replaced by a rubber cushion or some other buffer of equivalent and obvious character not calling for illustration.

I claim:—

1. The combination with a trolley-harp having its stem formed with a chamber, of a shank entered into the said chamber in which it has a slight rocking movement on a pivot, the said shank being formed with a transversely arranged recess located at a right angle to the longitudinal axis of the shank, and a buffer located within the said recess and forming a yielding connection between the stem and the shank.

2. The combination with a trolley-harp having its stem formed with a chamber, of a shank entered into the said chamber, a pivot passing through the lower end of the stem and the shank the inner end of which has limited rocking movement within the said chamber, a buffer housed within the said chamber and forming a yielding connection between the stem and the shank at a point above the said pivot.

3. The combination with a trolley-harp having a stem provided with a longitudinal chamber, of a shank entered into the said chamber, a pivot passing through the lower end of the stem and through the said shank which has limited rocking movement in the chamber, a buffer spring set into the extreme upper end of the shank and housed within the said chamber and forming a yielding connection between the shank and the stem, and a contact spring also housed within the said chamber and electrically connecting the shank and the stem.

4. The combination with a trolley-harp having a chambered stem, of a trolley pole shank entered into the said stem in which it is pivotally mounted, and formed with a spring recess, and a spring located in the said recess and coacting with the chambered stem.

In testimony whereof, I have signed this specification in the presence of two subscribing witnesses.

EDWARD D. ROCKWELL.

Witnesses:
EDSON M. PECK,
HOWARD S. PECK.